United States Patent
Baek et al.

(10) Patent No.: US 8,792,887 B2
(45) Date of Patent: Jul. 29, 2014

(54) METHOD AND APPARATUS FOR NETWORK REENTRY OF MOBILE STATION IN WIRELESS COMMUNICATION SYSTEM

(75) Inventors: Young-Kyo Baek, Seoul (KR); Ji-Cheol Lee, Seongnam-si (KR); Yeong-Moon Son, Yongin-si (KR); Hyun-Jeong Kang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 467 days.

(21) Appl. No.: 12/976,167

(22) Filed: Dec. 22, 2010

(65) Prior Publication Data

US 2011/0159906 A1 Jun. 30, 2011

(30) Foreign Application Priority Data

Dec. 24, 2009 (KR) ...................... 10-2009-00130477

(51) Int. Cl.
*H04W 4/00* (2009.01)

(52) U.S. Cl.
USPC ..................... 455/435.1; 455/404.2; 455/436; 455/445; 455/439; 370/331; 370/337; 370/419; 370/329

(58) Field of Classification Search
None
See application file for complete search history.

(56) References Cited

U.S. PATENT DOCUMENTS

| 8,229,428 B2 * | 7/2012 | Marsan et al. ............. 455/435.1 |
| 2005/0277417 A1 | 12/2005 | Yoon et al. |
| 2009/0279502 A1 | 11/2009 | Zheng et al. |

FOREIGN PATENT DOCUMENTS

KR 10-2007-0094306 A 9/2007

* cited by examiner

*Primary Examiner* — Kwasi Karikari
*Assistant Examiner* — Randy Peaches
(74) *Attorney, Agent, or Firm* — Jefferson IP Law, LLP

(57) ABSTRACT

A method and apparatus for network reentry of a Mobile Station (MS) in a wireless communication system are provided. The method includes receiving allocation of a context search identifier from a network while a network entry procedure is performed, and transmitting a ranging request message including the allocated context search identifier to a Base Station (BS) when a network reentry event occurs.

18 Claims, 11 Drawing Sheets

US 8,792,887 B2

METHOD AND APPARATUS FOR NETWORK REENTRY OF MOBILE STATION IN WIRELESS COMMUNICATION SYSTEM

PRIORITY

This application claims the benefit under 35 U.S.C. §119 (a) of a Korean patent application filed in the Korean Intellectual Property Office on Dec. 24, 2009 and assigned Serial No. 2009-0130477, the entire disclosure of which is hereby incorporated by reference.

BACKGROUND OF THE INVENTION

1. Field of the Invention

The present invention relates to a wireless communication system. More particularly, the present invention relates to a method and apparatus for identifying a Mobile Station (MS) for network reentry of the MS in the wireless communication system.

2. Description of the Related Art

In general, in a wireless access system based on a cellular network, a Mobile Station (MS) frequently experiences coverage loss due to a communication environment between a Base Station (BS) and the MS. When the coverage loss occurs, the BS deletes all of the information of the MS, when the MS to which the coverage loss occurs does not reenter the network within a specific duration.

Therefore, when the MS in a coverage loss state intends to resume communication with the network after a specific time elapses, an initial network entry procedure has to be re-performed since all of the information of the MS has been deleted in the BS. That is, in order to resume communication, the MS in the coverage loss state performs complex network entry procedures, such as synchronization, ranging, capability negotiation, authentication and key agreement, and registration. Accordingly, the re-performing of the complex network entry procedure results in the generation of service delay of the MS and overhead of the network, thereby deteriorating system efficiency.

SUMMARY OF THE INVENTION

An aspect of the present invention is to address at least the above-mentioned problems and/or disadvantages and to provide at least the advantages described below. Accordingly, an aspect of the present invention is to provide a method and apparatus for identifying a Mobile Station (MS) for network reentry of the MS in a wireless communication system.

Another aspect of the present invention is to provide a method and apparatus for network reentry of an MS in a coverage loss state by sharing MS identification information between the MS and a network in a wireless communication system.

Another aspect of the present invention is to provide a method and apparatus for network reentry of an MS by using MS information stored in an authenticator in a wireless communication system.

Another aspect of the present invention is to provide a method and apparatus for resuming communication by performing a network reentry procedure by an MS, of which information does not exist in a Base Station (BS), by sharing MS identification information between the MS and a network in a wireless communication system.

Another aspect of the present invention is to provide a method and apparatus for resuming communication by performing a network reentry procedure by an MS in a coverage loss state when an encryption key shared between the MS and a network is valid in a wireless communication system.

In accordance with an aspect of the present invention, a method of an MS for network reentry in a wireless communication system is provided. The method includes receiving allocation of a context search identifier from a network while a network entry procedure is performed, and transmitting a ranging request message including the allocated context search identifier to a BS when a network reentry event occurs.

In accordance with another aspect of the present invention, a method of a BS for network reentry of an MS in a wireless communication system is provided. The method includes transmitting to the MS a context search identifier received from a network device during a network entry procedure of the MS, receiving a ranging request message including the context search identifier from the MS, obtaining a context for the MS by using the context search identifier, and determining whether the MS is valid by using the context for the MS.

In accordance with yet another aspect of the present invention, an MS apparatus for network reentry in a wireless communication system is provided. The apparatus includes a receiver for receiving allocation of a context search identifier from a network while a network entry procedure is performed, a controller for providing control to generate a ranging request message including the allocated context search identifier when a network reentry event occurs, and a transmitter for transmitting the ranging request message.

In accordance with still another aspect of the present invention, a BS apparatus for network reentry of an MS in a wireless communication system is provided. The apparatus includes a transceiver for transmitting to the MS a context search identifier received from a network device during a network entry procedure of the MS, and for receiving a ranging request message including the context search identifier from the MS, and a controller for obtaining a context for the MS by using the context search identifier and for determining whether the MS is valid by using the context for the MS.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following detailed description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention described below relate to a method and apparatus for resuming communication in such a manner that identification information of a Mobile Station (MS) (hereinafter, also referred to as an Advanced MS (AMS)) is shared between the MS and a network in a wireless communication system to resume communication by performing a network reentry procedure by the MS of which information does not exist in a Base Station (BS) (hereinafter, also referred to as an Advanced BS (ABS)). It is assumed hereinafter that an Access Service Network Gate-Way (ASN-GW) includes an authenticator that is responsible for authentication of the MS. The authenticator may be configured independently from the ASN-GW.

Figure 1:
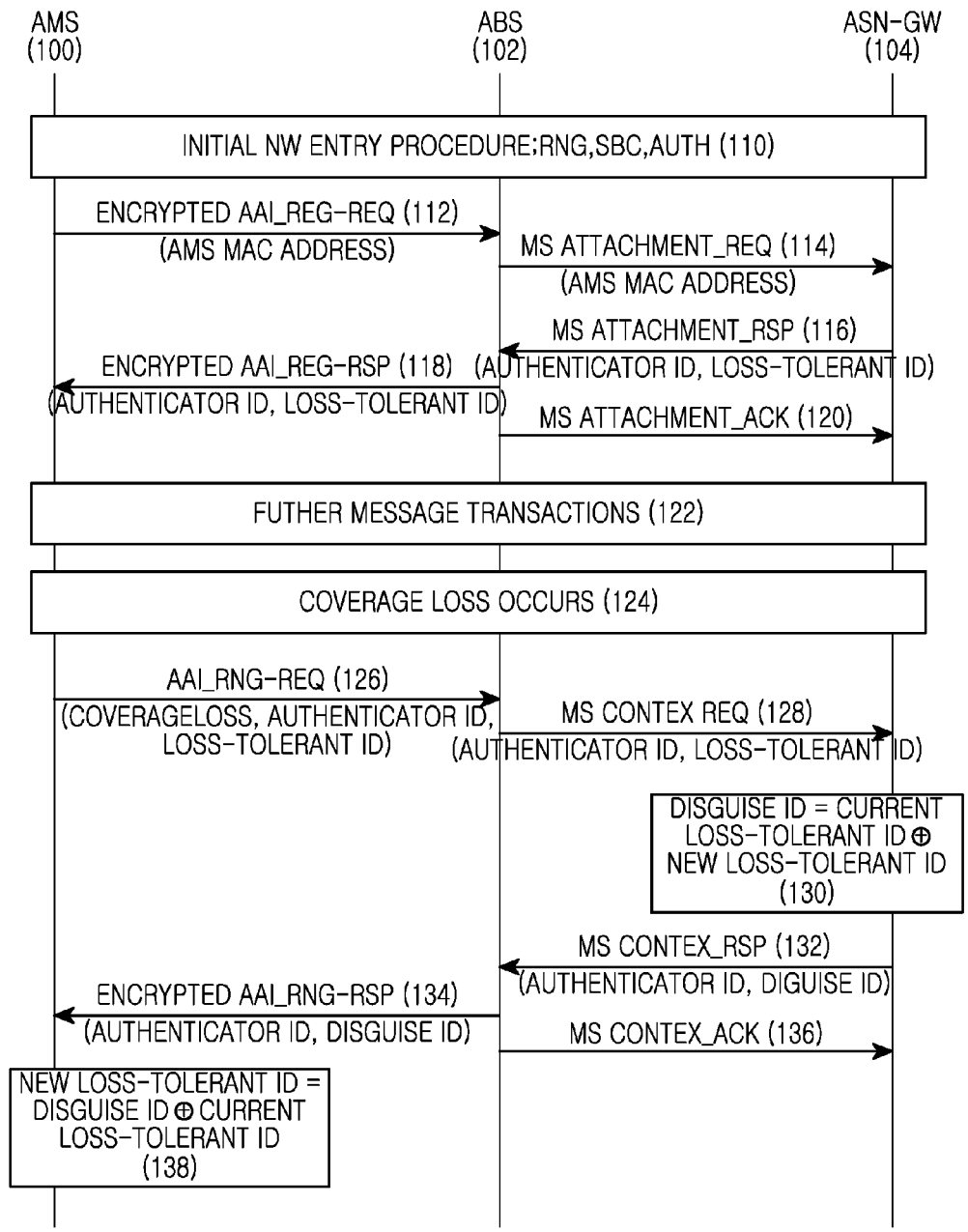
FIG. 1 illustrates a signal flow for network reentry of a Mobile Station (MS) in a wireless communication system according to an exemplary embodiment of the present invention.

FIG. 1 illustrates a signal flow for network reentry of an MS in a wireless communication system according to an exemplary embodiment of the present invention.

Referring to FIG. 1, an AMS 100 performs an initial network entry procedure with an ABS 102 and an ASN-GW (or an authenticator) 104 in step 110. The initial network entry procedure includes synchronization, ranging, capability negotiation, authentication and key agreement, registration, etc. When the initial network entry procedure is performed, the ABS 102 and the ASN-GW 104 may obtain and store information related to the security of the AMS 100, i.e., context information.

In step 112, the AMS 100 transmits an encrypted Advanced Air Interface_REGistration-REQuest (AAI_REG-REQ) message including an AMS Media Access Control (MAC) address to the ABS 102. Upon receiving the AMS MAC address, proceeding to step 114, the ABS 102 transmits the AMS MAC address to the ASN-GW 104 by using an MS attachment_REQ message.

Upon receiving the AMS MAC address, proceeding to step 116, the ASN-GW 104 generates a loss-tolerant IDentifier (ID) for searching for AMS context information, and transmits to the ABS 102 an MS attachment_ReSPonse (RSP) message including the generated loss-tolerant ID and an authenticator ID for managing authentication of the AMS 100. Herein, the ASN-GW 104 stores the generated loss-tolerant ID by mapping the ID to the AMS MAC address and the context information obtained in the initial network entry procedure performed by the AMS 100. In this case, the ASN-GW 104 may transmit the loss-tolerant ID and the authenticator ID to the ABS 102 by configuring the IDs into one ID according to a predefined rule. That is, although it will be described in an exemplary embodiment of the present invention that the loss-tolerant ID and the authenticator ID are transmitted/received together, it is also possible to transmit/receive one ID configured by using the loss-tolerant ID and the authenticator ID.

Upon receiving the MS attachment_RSP message, proceeding to step 118, the ABS 102 transmits to the AMS 100 an encrypted AAI_REG-RSP message including the authenticator ID and the loss-tolerant ID which are transmitted from the ASN-GW 104. In step 120, the ABS 102 transmits to the ASN-GW 104 an MS attachment_ACKnowledgment (ACK) message in response to the MS attachment_RSP message. In this case, the steps 118 and 120 may be performed in parallel, or may be performed in a reverse order.

In step 122, the AMS 100 transmits/receives a message for call connection via the ABS 102 and the ASN-GW 104. In this case, the AMS 100 loses coverage due to a wireless environment between the AMS 100 and the ABS 102 in step 124. When a specific time elapses after the coverage loss occurs for the AMS 100, the ABS 102 deletes all of information related to the AMS 100.

Thereafter, if an event that requires communication resumption occurs for the AMS 100, proceeding to step 126, the AMS 100 transmits to the ABS 102 an AAI_RNG-REQ message for a ranging of network reentry due to the coverage loss. Herein, the AAI_RaNGing (RNG)-REQ message includes the authenticator ID, the loss-tolerant ID, and a Cipher-based Message Authentication Code (CMAC) tuple.

Thereafter, since the ABS 102 does not have information on the AMS 100 when a specific time elapses after the coverage loss of the AMS 100, the ABS 102 transmits an MS context_REQ message to the ASN-GW 104 in step 128. Herein, the MS context_REQ message may include the authenticator ID and the loss-tolerant ID which are received from the AMS 100, so as to request the ASN-GW 104 to transmit a context for the AMS 100. In this case, the ABS 102 may transmit the MS context_REQ message to the ASN-GW 104 corresponding to the authenticator ID.

Upon receiving the MS context_REQ message, proceeding to step 130, the ASN-GW 104 generates a new loss-tolerant ID on the basis of the received loss-tolerant ID, and generates a disguise ID to reliably deliver the new loss-tolerant ID to the AMS 100. Herein, the disguise ID may be generated by using the received loss-tolerant ID and the new loss-tolerant ID. For example, the disguise ID may be generated by performing an Exclusive OR (XOR) operation on the received loss-tolerant ID and the new loss-tolerant ID. In addition, the ASN-GW 104 searches for the context for the AMS 100 on the basis of the received loss-tolerant ID, and proceeding to step 132, transmits to the ABS 102 an MS context_RSP message including the found context, the authenticator ID, and the disguise ID. Herein, the context transmitted to the ABS 102 includes an Authorization Key (AK) context. Although the generated disguise ID is transmitted to the AMS 100 on the basis of the new loss-tolerant ID in order to improve security for the new loss-tolerant ID, it is reasonable for the ASN-GW 104 to transmit the new loss-tolerant ID to the AMS 100 instead of the disguise ID.

Thereafter, the ABS 102 determines whether the AAI_RNG-REQ message transmitted by the AMS 100 is valid, by using the MS context obtained from the ASN-GW 104. Herein, the ABS 102 obtains a CMAC key from the MS context, generates a CMAC tuple by using the CMAC key and information included in the AAI_RNG-REQ message, and thereafter compares the generated CMAC tuple with the CMAC tuple included in the AAI_RNG-REQ to determine whether the AMS 100 is a normal AMS or an AMS that attempts an attack.

If it is determined that the AAI_RNG-REQ is valid, proceeding to step 134, the ABS 102 generates an encrypted AAI_RNG-RSP message including the authenticator ID and the disguise ID which are received from the ASN-GW 104 and transmits the generated message to the AMS 100. In step 136, the ABS 102 transmits to the ASN-GW 104 an MS context_ACK message in response to the MS context_RSP message. Herein, the steps 134 and 136 may be performed in parallel, or may be performed in a reverse order.

Upon receiving the encrypted AAI_RNG-RSP message, proceeding to step 138, the AMS 100 may obtain a new loss-tolerant ID from the disguise ID and resume communication by using the new loss-tolerant ID. Herein, the AMS 100 may obtain the new loss-tolerant ID by performing an XOR operation on the loss-tolerant ID and the disguise ID which are stored in the AMS 100.

Although it has been described above that the AMS 100 loses coverage of the ABS 102, an exemplary embodiment of the present invention equally applies to a case where the AMS 100 is in a Deregistration with Content Retention (DCR) mode. Herein, the DCR mode is a mode in which the MS context is stored in a super-ordinate network (e.g., the authenticator) even if the AMS 100 is not currently connected to the network and the MS context is deleted in the ABS 102.

Figure 2:
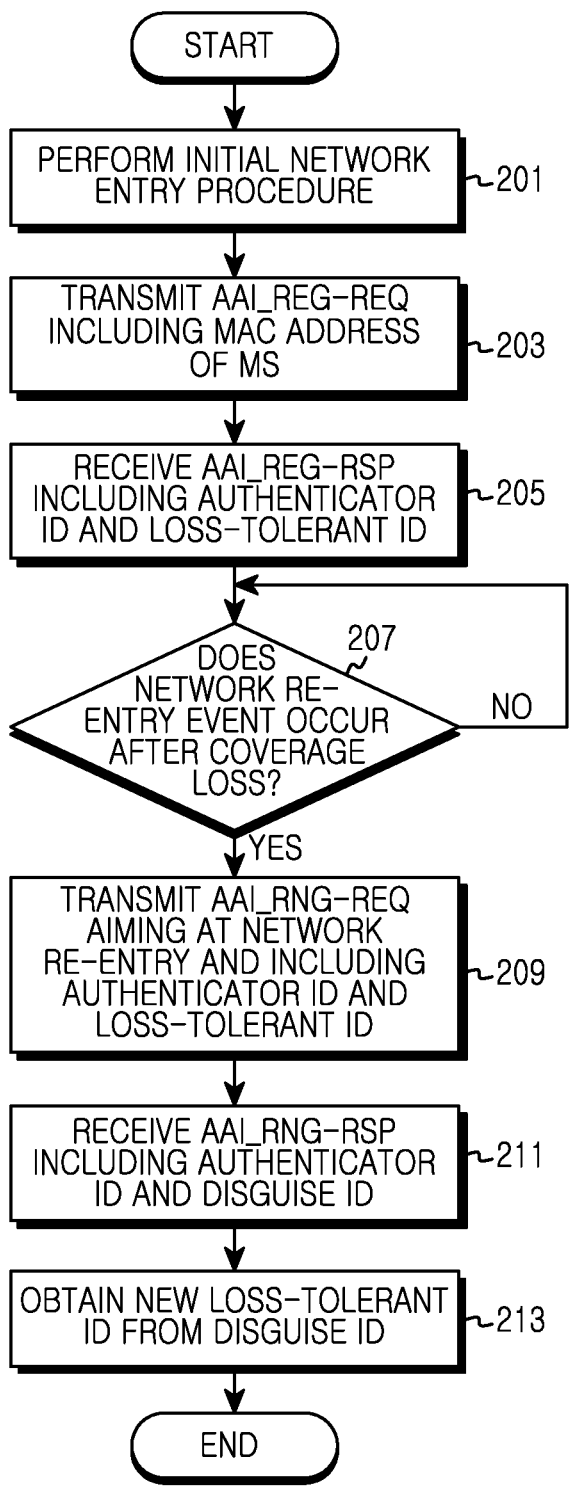
FIG. 2 is a flowchart illustrating a network reentry procedure of an MS in a wireless communication system according to an exemplary embodiment of the present invention.

FIG. 2 is a flowchart illustrating a network reentry procedure of an MS in a wireless communication system according to an exemplary embodiment of the present invention.

Referring to FIG. 2, the MS performs an initial network entry procedure in step 201, and proceeding to step 203, transmits to a BS an encrypted AAI_REG-REQ message including a MAC address of the MS. In step 205, the MS receives from the BS an encrypted AAI-REG-RSP message including an authenticator ID and a loss-tolerant ID.

In step 207, the MS determines whether an event that requires network reentry occurs in a state of losing coverage of the BS. If the event that requires network reentry occurs after losing the coverage of the BS, proceeding to step 209, the MS transmits to the BS an AAI_RNG-REQ message including the authenticator ID, the loss-tolerant ID, and a CMAC. Herein, the AAI_RNG-REQ message includes a ranging purpose indicator which indicates network reentry caused by the coverage loss.

In step 211, the MS receives from the BS an AAI_RNG-RSP message including the authenticator ID and a disguise ID. In step 213, the MS obtains a new loss-tolerant ID from the disguise ID, and resumes communication. Herein, the MS may obtain the new loss-tolerant ID by performing an XOR operation on the disguise ID and the loss-tolerant ID obtained before the coverage loss.

Thereafter, the procedure of FIG. 2 ends.

Figure 3:
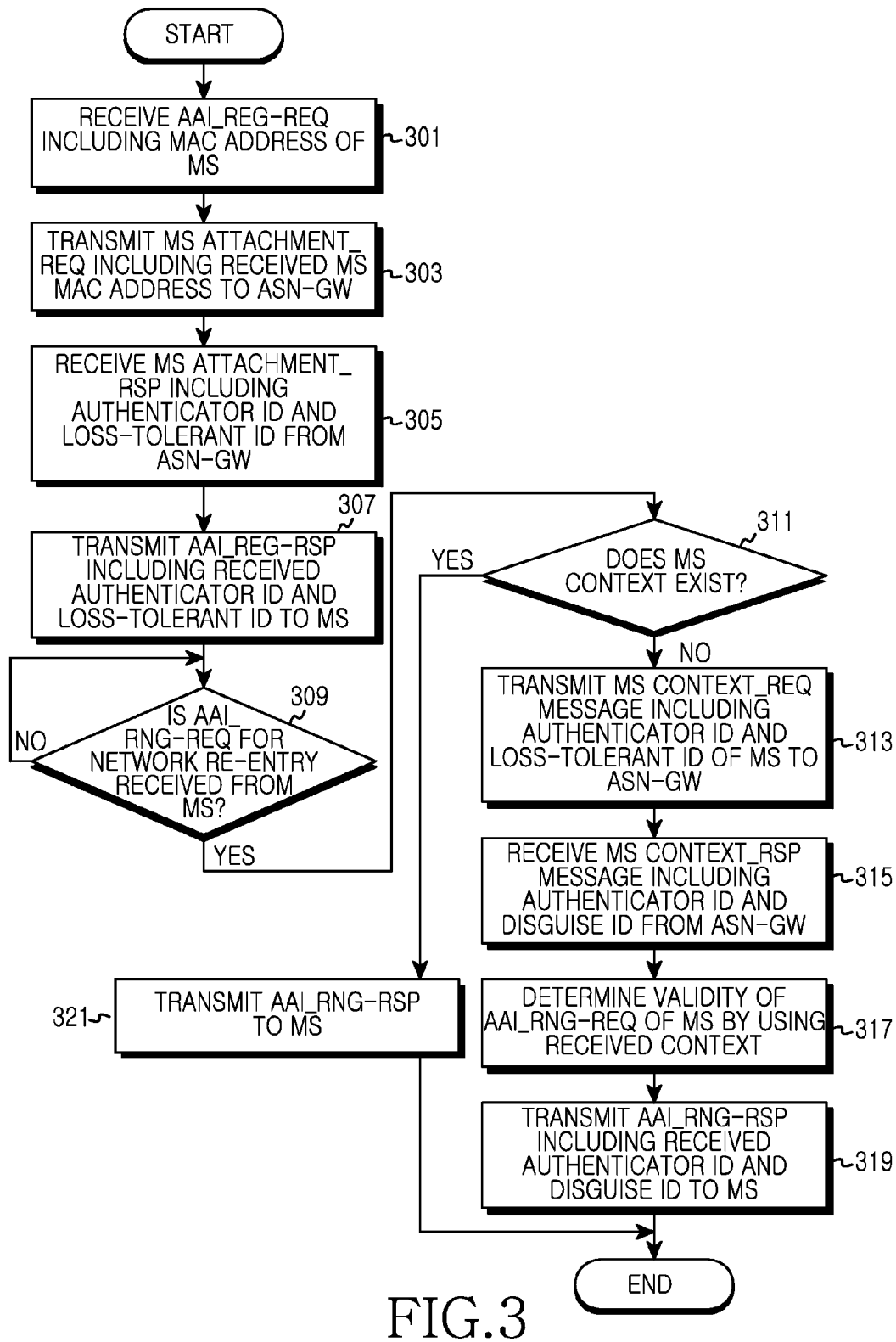
FIG. 3 is a flowchart illustrating an operation of a Base Station (BS) for network reentry of an MS in a wireless communication system according to an exemplary embodiment of the present invention.

FIG. 3 is a flowchart illustrating an operation of a BS for network reentry of an MS in a wireless communication system according to an exemplary embodiment of the present invention.

Referring to FIG. 3, in step 301, the BS receives an AAI_REG-REQ message including a MAC address of the MS from the MS which has performed initial network entry. In step 303, the BS transmits to an ASN-GW an MS attachment_REQ message including the MAC address of the MS.

In step 305, the BS receives an MS attachment_RSP message including an authenticator ID and a loss-tolerant ID from the ASN-GW. In step 307, the BS generates an encrypted AAI_REG-RSP message including the received authenticator ID and loss-tolerant ID, and transmits the generated message to the MS. In this case, the BS transmits to the ASN-GW an MS attachment_ACK message in response to the MS attachment_RSP message.

In step 309, the BS determines whether an AAI_RNG-REQ message for the network reentry caused by the coverage loss is received from the MS. If the AAI_RNG-REQ message for the network reentry is received, proceeding to step 311, the BS determines whether a context for the MS exists. That is, the BS determines whether all of the information of the MS is deleted since a specific time elapses after the coverage loss of the MS or whether the information of the MS exists since the specific time does not elapse. Herein, if the context for the MS exists, proceeding to step 321, the BS transmits an AAI_RNG-RSP message to the MS according to the conventional method. Thereafter, the procedure of FIG. 3 ends.

Otherwise, if the context for the MS does not exist, proceeding to step 313, the BS generates an MS context_REQ message including the authenticator ID and the loss-tolerant ID which are included in the AAI_RNG-REQ message and transmits the generated message to the ASN-GW. In step 315, the BS receives an MS context_RSP message including the authenticator ID and a disguise ID from the ASN-GW.

In step 317, the BS determines whether the AAI_RNG-REQ message of the MS is valid, by using the MS context included in the MS context_RSP message. Herein, the BS obtains a CMAC key from the MS context, generates a CMAC tuple by using the CMAC key and information included in the AAI_RNG-REQ message, and thereafter compares the generated CMAC tuple with the CMAC tuple included in the AAI_RNG-REQ to determine whether the MS is a normal MS or an MS that attempts an attack. If the generated CMAC tuple is identical to the CMAC tuple included in the AAI_RNG-REQ, the BS may determine that the MS is the normal MS and the AAI_RNG-REQ message is a valid message. Otherwise, if the generated CMAC tuple is different from the CMAC tuple included in the AAI_RNG-REQ, the BS may determine that the MS is an abnormal MS that attempts an attack and that the AAI_RNG-REQ message is invalid. Although not shown herein, if the AAI_RNG-REQ message is invalid, the BS may transmit no message in response to the AAI_RNG-REQ message or may perform a security procedure according to the conventional method.

Otherwise, if the AAI_RNG-REQ message is a valid message, proceeding to step 319, the BS generates an encrypted AAI_RNG-RSP message including the authenticator ID and the disguise ID which are received from the ASN-GW by using the MS context RSP message, and thereafter transmits the generated message to the MS.

Thereafter, the procedure of FIG. 3 ends.

Figure 4:
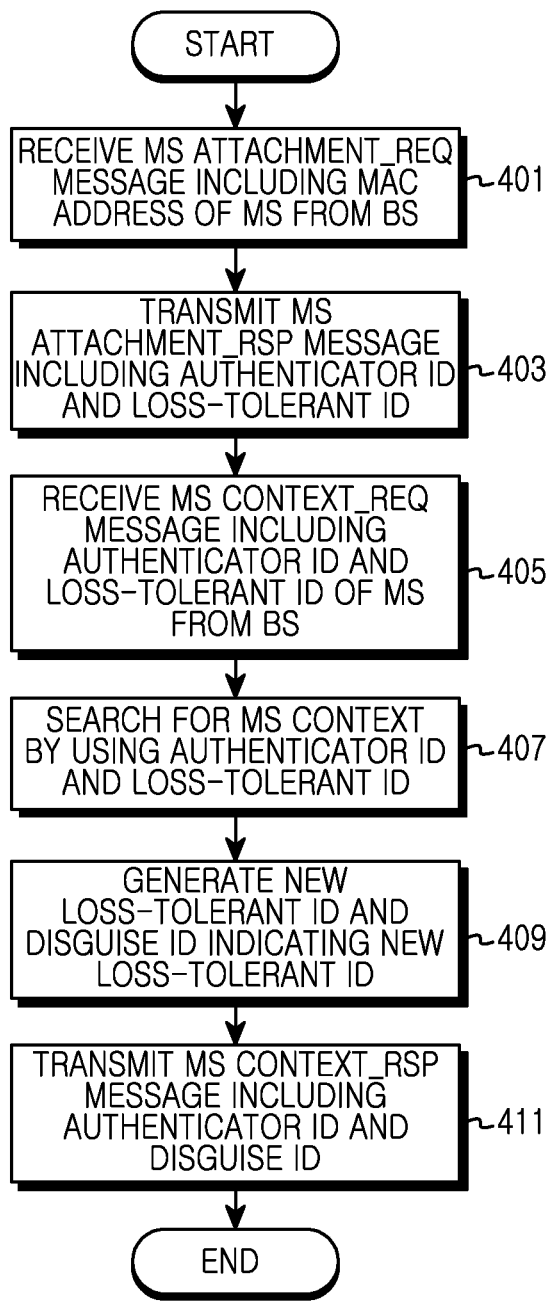
FIG. 4 is a flowchart illustrating an operation of an Access Service Network GateWay (ASN-GW) for network reentry of an MS in a wireless communication system according to an exemplary embodiment of the present invention.

FIG. 4 is a flowchart illustrating an operation of an ASN-GW for network reentry of an MS in a wireless communication system according to an exemplary embodiment of the present invention.

Referring to FIG. 4, in step 401, the ASN-GW receives from a BS an MS attachment_REQ message including a MAC address of the MS. In step 403, the ASN-GW transmits an MS attachment_RSP message including an authenticator ID and a loss-tolerant ID. Herein, the ASN-GW may generate the loss-tolerant ID of the MS and store the generated loss-tolerant ID by mapping the ID to MS context information in an initial network entry procedure of the MS. Upon receiving the MAC address of the MS, the ASN-GW may generate the loss-tolerant ID and then may store the loss-tolerant ID by mapping the ID to the context information obtained in the initial network entry procedure of the MS. In this case, the ASN-GW may transmit the loss-tolerant ID and the authenticator ID to the BS by configuring the IDs into one ID according to a predefined rule. That is, although it will be described herein that the loss-tolerant ID and the authenticator ID are transmitted/received together, it is also possible to transmit/receive one ID configured by using the loss-tolerant ID and the authenticator ID.

In step 405, the ASN-GW receives from the BS an MS context_REQ message including the authenticator ID and the loss-tolerant ID. In step 407, the ASN-GW searches for the MS context information by using the received loss-tolerant ID. Herein, the context information includes an AK context.

In step 409, the ASN-GW generates a new loss-tolerant ID of the MS corresponding to the loss-tolerant ID, and generates a disguise ID that indicates the new loss-tolerant ID. In this case, the disguise ID may be generated by using the old loss-tolerant ID and the new loss-tolerant ID. For example, the disguise ID may be generated by performing an XOR operation on the old loss-tolerant ID and the new loss-tolerant ID.

In step 411, the ASN-GW transmits to the BS an MS context_RSP message including the authenticator ID and the disguise ID. Thereafter, the procedure of FIG. 4 ends.

Figure 5:
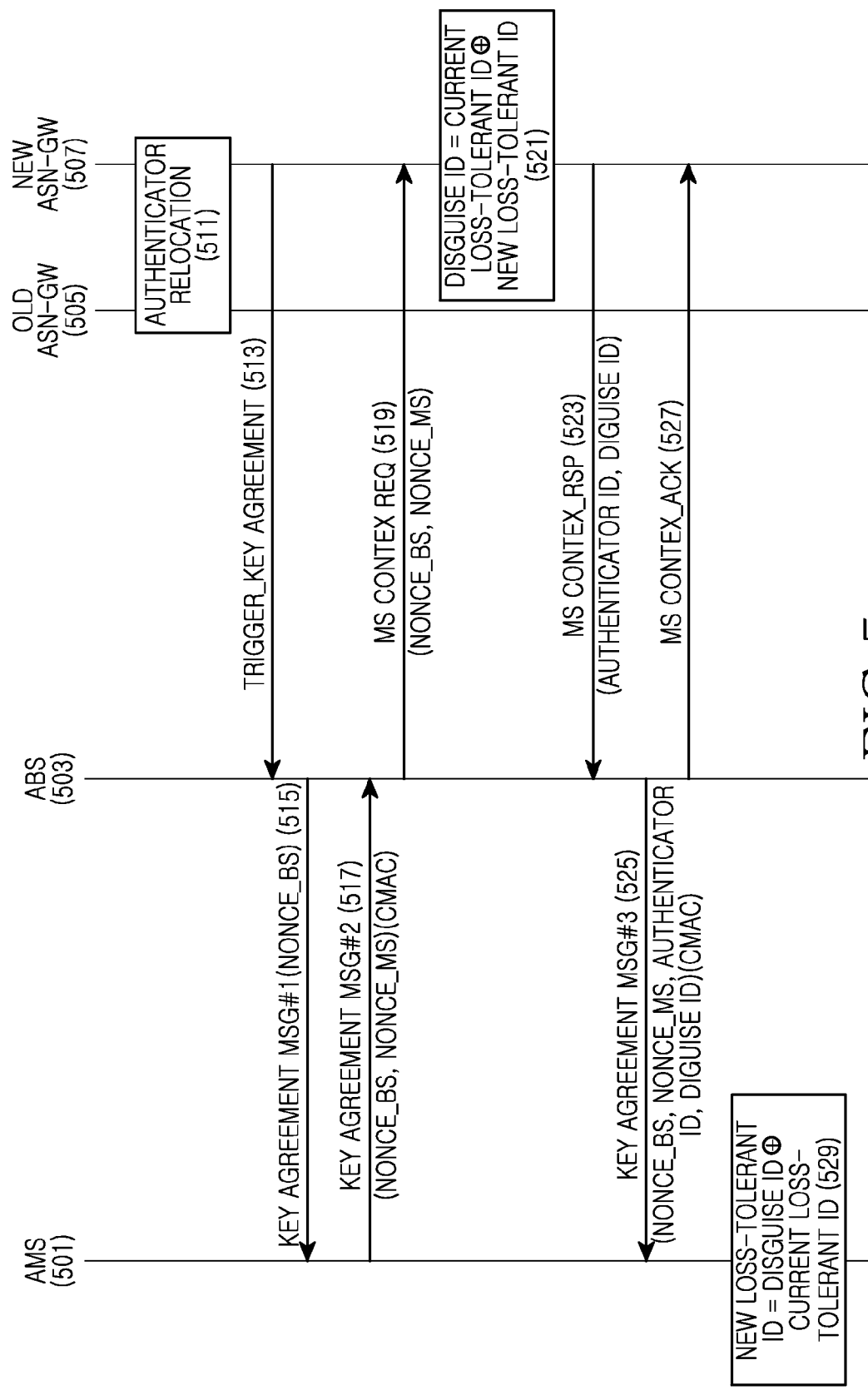
FIG. 5 illustrates a signal flow for updating MS identification information shared between an MS and a network when an ASN-GW is replaced in a wireless communication system according to an exemplary embodiment of the present invention.

FIG. 5 illustrates a signal flow for updating MS identification information shared between an MS and a network when an ASN-GW is replaced in a wireless communication system according to an exemplary embodiment of the present invention.

Referring to FIG. 5, when an old ASN-GW 505 that is responsible for authentication of an AMS 501 is replaced with a new ASN-GW 507 in step 511, the new ASN-GW 507 transmits a Trigger_key agreement message for starting a key agreement procedure to an ABS 503, which serves for the AMS 501, in step 513.

Upon receiving the Trigger_key agreement message for starting the key agreement procedure, the ABS 503 transmits a key agreement MeSsaGe (MSG)#1 to the AMS 501 in step 515. In this case, the key agreement MSG#1 includes a NONCE_BS generated by the ABS 503.

In step 517, the AMS 501 transmits a key agreement MSG#2 to the ABS 503. In this case, the key agreement MSG#2 includes the NONCE_BS generated by the ABS 503 and NONCE_MS and CMAC generated by the AMS 501.

Upon receiving the key agreement MSG#2, the ABS 503 transmits an MS context_REQ message to the new ASN-GW 507 in step 519. The new ASN-GW 507 generates a new loss-tolerant ID for the AMS 501 in step 521, and generates a disguise ID to reliably deliver the new loss-tolerant ID to the AMS 501. For example, the disguise ID may be generated by performing an XOR operation on the loss-tolerant ID generated by the old ASN-GW 505 and the new loss-tolerant ID. In step 523, the ASN-GW 507 transmits to the ABS 503 an MS context_RSP message including the authenticator ID and the disguise ID.

In step 525, the ABS 503 generates a key agreement MSG#3 including the authenticator ID and the disguise ID which are received from the new ASN-GW 507 and transmits the generated message to the AMS 501. In this case, the key agreement MSG#3 includes the NONCE_BS, the NONCE_MS, and the CMAC. In step 527, the ABS 503 transmits an MS context_ACK message to the new ASN-GW 507 in response to the MS context_RSP message. Herein, the steps 525 and 527 may be performed in parallel, or may be performed in a reverse order.

In step 529, the AMS 501 may obtain a new loss-tolerant ID from the disguise ID. Herein, the AMS 501 may obtain the new loss-tolerant ID by performing an XOR on the loss-tolerant ID received from the old ASN-GW 505 and the disguise ID received from the new ASN-GW 507.

Figure 6:
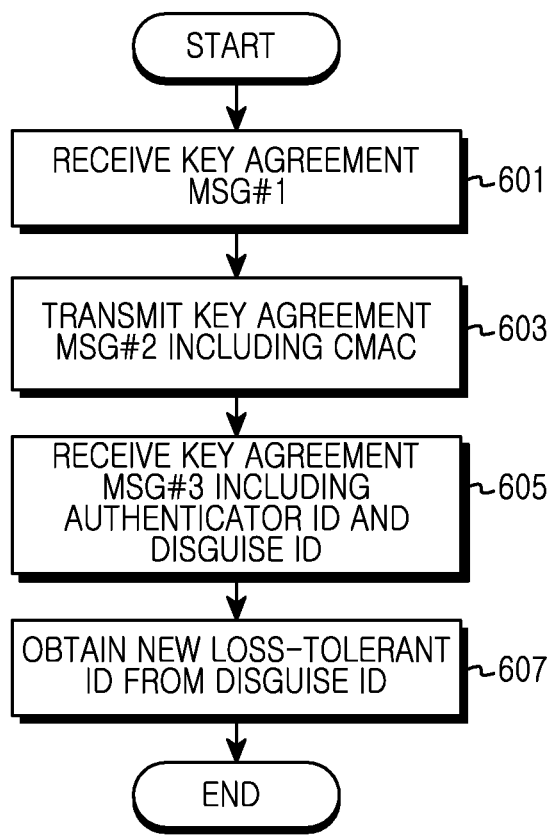
FIG. 6 is a flowchart illustrating an operation of an MS when an ASN-GW is replaced in a wireless communication system according to an exemplary embodiment of the present invention.

FIG. 6 is a flowchart illustrating an operation of an MS when an ASN-GW is replaced in a wireless communication system according to an exemplary embodiment of the present invention.

Referring to FIG. 6, the MS receives a key agreement MSG#1 from a BS in step 601, and transmits a key agreement MSG#2 to the BS in step 603. In this case, the key agreement MSG#2 includes a NONCE_BS generated by the BS and NONCE_MS and CMAC generated by the MS.

Thereafter, the MS receives a key agreement MSG#3 including an authenticator ID and a disguise ID from the BS in step 605, and obtains a new loss-tolerant ID from the disguise ID in step 607. In this case, the new loss-tolerant ID is caused by the replacement of the ASN-GW, and may be obtained from the loss-tolerant ID and the disguise ID which are obtained from the old ASN-GW. For example, the new loss-tolerant ID may be obtained by the new ASN-GW by performing an XOR on the loss-tolerant ID and the disguise ID which are received from the old ASN-GW.

Figure 7:
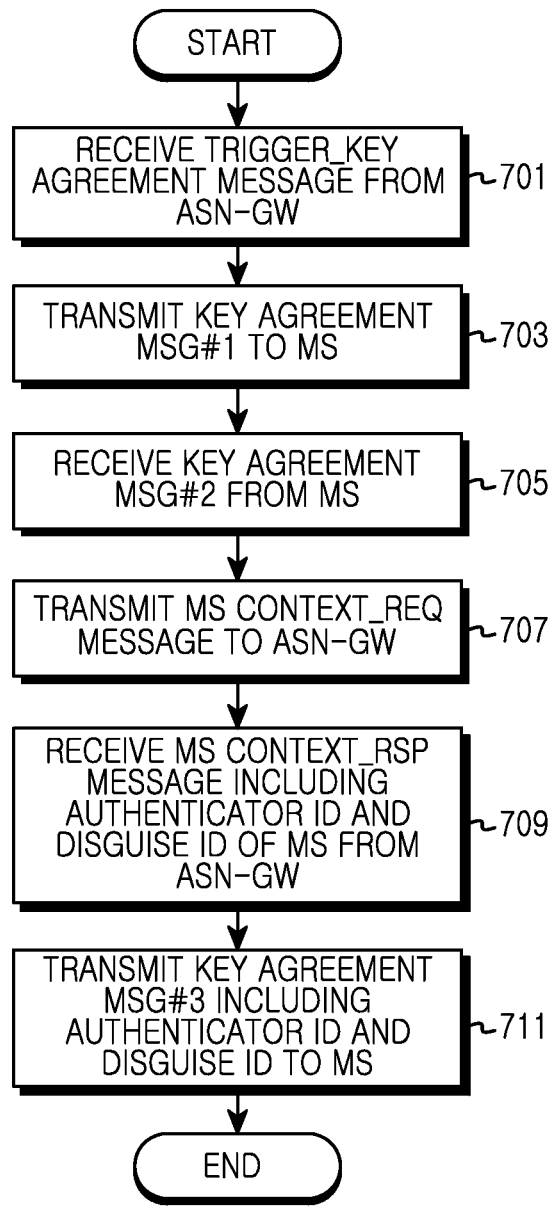
FIG. 7 is a flowchart illustrating an operation of a BS when an ASN-GW is replaced in a wireless communication system according to an exemplary embodiment of the present invention.

FIG. 7 is a flowchart illustrating an operation of a BS when an ASN-GW is replaced in a wireless communication system according to an exemplary embodiment of the present invention.

Referring to FIG. 7, the BS receives a Trigger_key agreement message for starting a key agreement procedure from the ASN-GW in step 701. In this case, the Trigger_key agreement message for starting the key agreement procedure may be received from a new ASN-GW when the old ASN-GW that is responsible for authentication of a specific MS is replaced with the new ASN-GW.

The BS transmits a key agreement MSG#1 to the specific MS in step 703, and receives a key agreement MSG#2 from the specific MS in step 705. In this case, the key agreement MSG#1 includes a NONCE_BS generated by the BS, and the key agreement MSG#2 includes the NONCE_BS generated by the BS and NONCE_MS and CMAC generated by the MS.

Thereafter, the BS transmits an MS context_REQ message to the ASN-GW in step 707, and receives an MS context_RSP message including an authenticator ID and a disguise ID of the MS from the ASN-GW in step 709.

In step 711, the BS generates a key agreement MSG#3 including the authenticator ID and the disguise ID which are received from the ASN-GW and transmits the generated message to the MS. Thereafter, the procedure of FIG. 7 ends.

Figure 8:
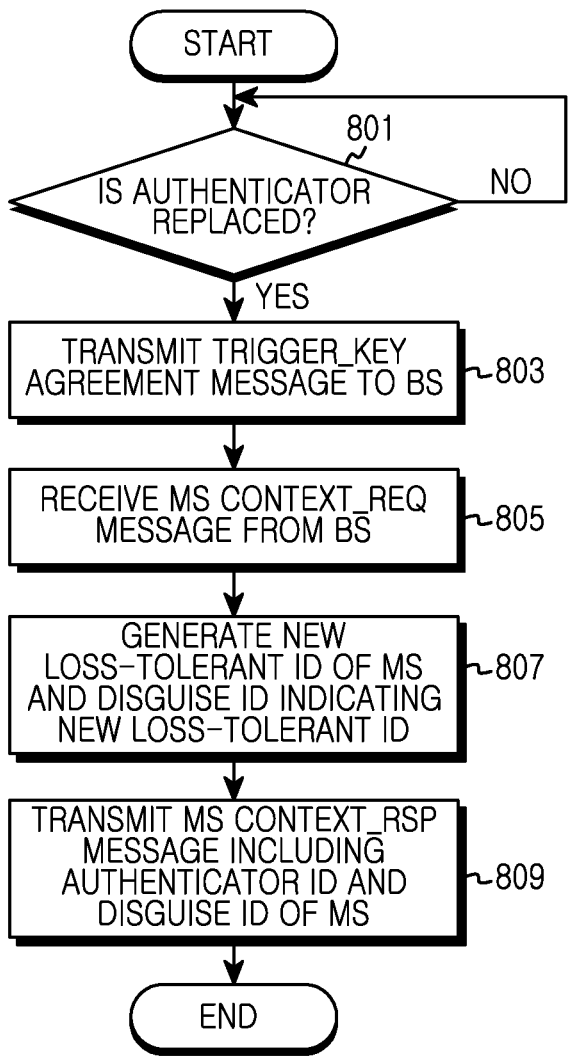
FIG. 8 is a flowchart illustrating an operation of an ASN-GW when the ASN-GW is replaced in a wireless communication system according to an exemplary embodiment of the present invention.

FIG. 8 is a flowchart illustrating an operation of an ASN-GW when the ASN-GW is replaced in a wireless communication system according to an exemplary embodiment of the present invention.

Referring to FIG. 8, when the ASN-GW is replaced with a new ASN-GW that is responsible for authentication of a specific MS in step 801, proceeding to step 803, the ASN-GW transmits a Trigger_key agreement message for starting a key agreement procedure to a BS which serves for the specific MS.

In step 805, the ASN-GW receives an MS context_REQ message from the BS. In this case, the MS context_REQ message includes a NONCE_BS generated by the BS and a NONCE_MS generated by the MS.

In step 807, the ASN-GW generates a new loss-tolerant ID for the specific MS and generates a disguise ID that indicates the new loss-tolerant ID. For example, the disguise ID may be generated by performing an XOR operation on the old loss-tolerant ID generated for the MS by the old ASN-GW and the new loss-tolerant ID. Herein, the loss-tolerant ID generated for the MS by the old ASN-GW may be obtained from the old ASN-GW when the ASN-GW is replaced with the new ASN-GW.

In step 809, the ASN-GW transmits to the BS an MS context_RSP message including an authenticator ID and a disguise ID which correspond to the replaced ASN-GW. Thereafter, the procedure of FIG. 8 ends.

Figure 9:
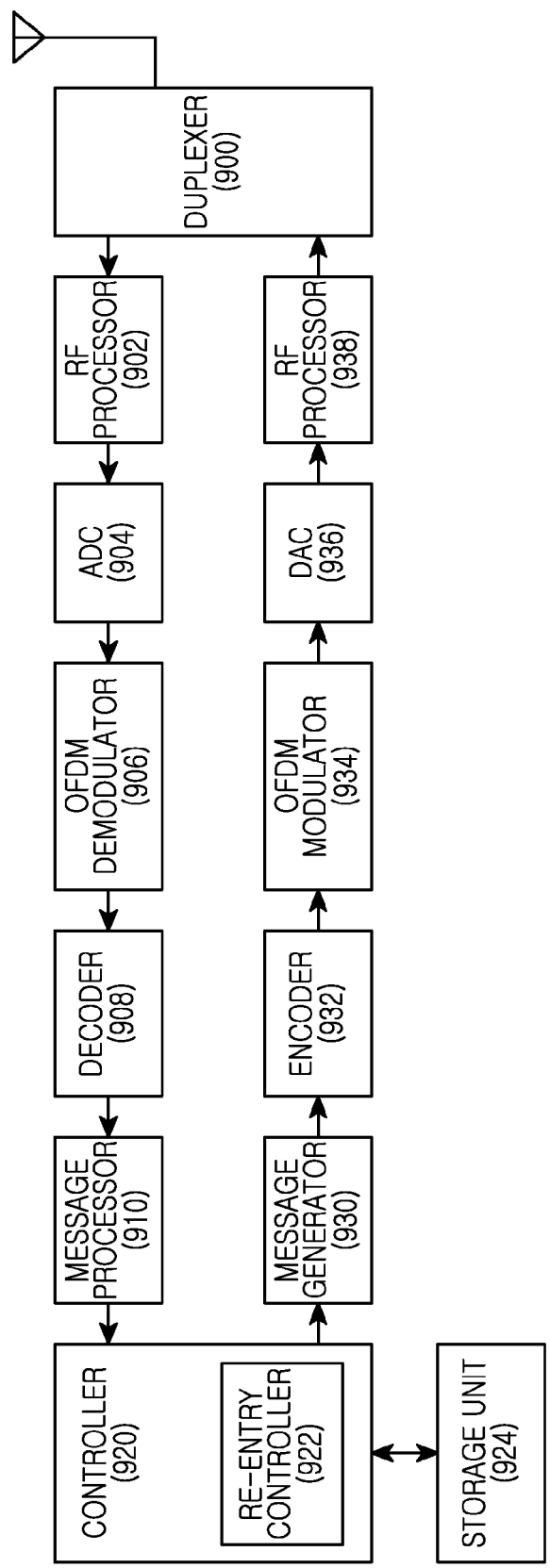
FIG. 9 is a block diagram illustrating a structure of an MS in a wireless communication system according to an exemplary embodiment of the present invention.

FIG. 9 is a block diagram illustrating a structure of an MS in a wireless communication system according to an exemplary embodiment of the present invention.

Referring to FIG. 9, the MS includes a duplexer 900, a Radio Frequency (RF) processor 902, an Analog/Digital Converter (ADC) 904, an Orthogonal Frequency Division Multiplexing (OFDM) demodulator 906, a decoder 908, a message processor 910, a controller 920, a storage unit 924, a message generator 930, an encoder 932, an OFDM modulator 934, a Digital/Analog Converter (DAC) 936, and an RF processor 938.

The duplexer 900 transmits a Transmit (Tx) signal provided from the RF processor 938 through an antenna according to a duplexing scheme, and provides the RF processor 902 with a Receive (Rx) signal received from the antenna.

The RF processor 902 converts an RF signal provided from the duplexer 900 into a baseband analog signal. The ADC 904 converts the analog signal provided from the RF processor 902 into digital sample data. The OFDM demodulator 906 converts the time-domain sample data provided from the ADC 904 into frequency-domain data by performing a Fast Fourier Transform (FFT) operation. The decoder 908 selects data of to-be-received subcarriers from the frequency-domain data, and thereafter demodulates and decodes the selected data according to a predefined Modulation and Coding Scheme (MCS) level. The message processor 910 extracts control information from the signal provided from the decoder 908, and transmits the control information to the controller 920.

The controller 920 controls and processes an overall operation of the MS. When performing an initial network entry procedure, the controller 920 receives an authenticator ID and a loss-tolerant ID and stores the received IDs in the storage unit 924. The controller 920 includes a reentry controller 922 to control and process a function for resuming communication by performing a network reentry procedure on the basis of the pre-stored authenticator ID and loss-tolerant ID when an event for resuming communication occurs in a state where the MS does not enter the network. That is, the controller 920 controls and processes a function for transmitting to a BS a ranging request message for network reentry that includes the authenticator ID, the loss-tolerant ID, and a CMAC tuple. Further, upon receiving a disguise ID by means of the message processor 910, the controller 920 obtains a new loss-tolerant ID by performing a logic operation on the pre-stored loss-tolerant ID and the disguise ID, and controls and processes a function for deleting the pre-stored loss-tolerant ID and for storing the new loss-tolerant ID.

The storage unit 924 stores a variety of programs and data for the overall operation of the MS. Under the control of the controller 920, the storage unit 924 stores the authenticator ID and the loss-tolerant ID.

The message generator 930 generates messages for initial network entry, network reentry, and key agreement under the control of the controller 920. For example, the message generator 930 may generate a ranging purpose indicator, which indicates the network reentry caused by a coverage loss, the authenticator ID, and the loss-tolerant ID.

The encoder 932 encodes and modulates Tx data and a control message, which is generated by the message generator 930, according to the MCS level. The OFDM modulator 934 converts the frequency-domain data provided from the encoder 932 into time-domain sample data (i.e., OFDM symbols) by performing an Inverse Fast Fourier Transform (IFFT) operation. The DAC 936 converts the sample data provided from the OFDM modulator 934 into an analog signal. The RF processor 938 converts the baseband analog signal provided from the DAC 936 into an RF signal.

Figure 10:
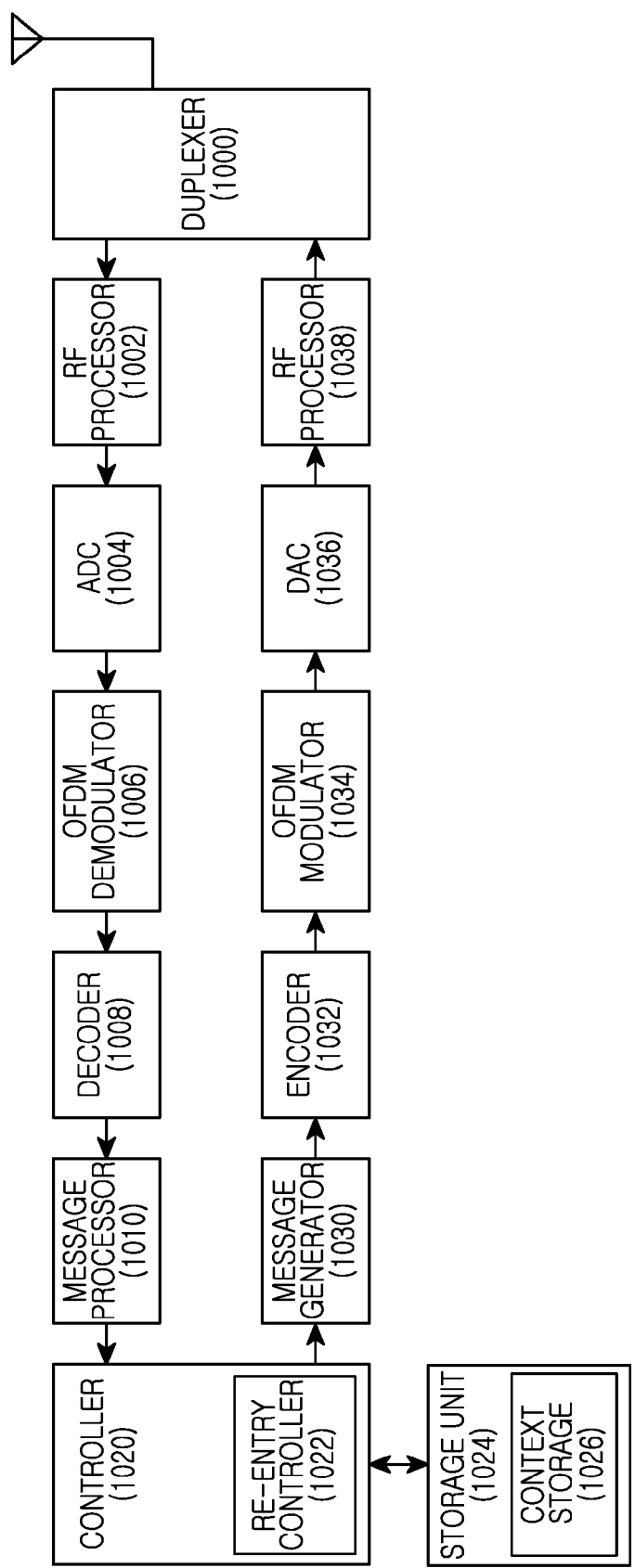
FIG. 10 is a block diagram illustrating a structure of a BS in a wireless communication system according to an exemplary embodiment of the present invention.

FIG. 10 is a block diagram illustrating a structure of a BS in a wireless communication system according to an exemplary embodiment of the present invention.

Referring to FIG. 10, the BS includes a duplexer 1000, an RF processor 1002, an ADC 1004, an OFDM demodulator 1006, a decoder 1008, a message processor 1010, a controller 1020, a storage unit 1024, a message generator 1030, an encoder 1032, an OFDM modulator 1034, a DAC 1036, and an RF processor 1038.

The duplexer 1000 transmits a Tx signal provided from the RF processor 1038 through an antenna according to a duplexing scheme, and provides the RF processor 1002 with an Rx signal received from the antenna.

The RF processor 1002 converts an RF signal provided from the duplexer 1000 into a baseband analog signal. The ADC 1004 converts the analog signal provided from the RF processor 1002 into digital sample data. The OFDM demodulator 1006 converts the time-domain sample data provided from the ADC 1004 into frequency-domain data by performing an FFT operation. The decoder 1008 selects data of to-be-received subcarriers from the frequency-domain data, and thereafter demodulates and decodes the selected data according to a predefined MCS level. The message processor 1010 extracts control information from the signal provided from the decoder 1008, and transmits the control information to the controller 1020.

The controller 1020 controls initial network entry and reentry of an MS, and controls and processes a function for obtaining context information for the MS and for storing the context information in the storage unit 1024 when an initial network entry procedure of the MS is performed. Further, if the MS does not reenter the network during a specific time period after a coverage loss occurs, the controller 1020 controls and processes a function for deleting information related to the MS, i.e., the context information.

The controller 1020 includes a reentry controller 1022 to control and process a function for searching for the MS context information from the storage unit 1024 if a ranging request message for the network reentry is received from the MS, and for requesting an ASN-GW to transmit the MS context if the MS context information does not exist. For example, the controller 1020 controls and processes a function for generating an MS context_REQ message and then for transmitting the generated message to the ASN-GW. The MS context_REQ message includes an authenticator ID and a loss-tolerant ID of the MS, and these IDs are included in the ranging request message. If the MS context information is received from the ASN-GW, the controller 1020 controls and processes a function for obtaining a CMAC key from the context information, for generating a CMAC tuple to determine whether the MS is a valid MS, and thereafter for transmitting a ranging response message for the network reentry of the MS. Further, when the authenticator ID and the disguise ID are received from the ASN-GW, the controller 1020 controls and processes a function for transmitting these IDs to the MS.

The storage unit 1024 stores a variety of programs and data for the overall operation of the BS. The storage unit 1024 includes a context storage 1026 to store the MS context information which is obtained either in the initial network entry procedure of the MS or in the network reentry procedure of the MS.

The message generator 1030 generates messages for network entry, reentry, and key agreement of the MS under the control of the controller 1020. For example, the message generator 1030 may generate an MS context_REQ message including the authenticator ID and the loss-tolerant ID of the MS.

The encoder 1032 encodes and modulates Tx data and a control message, which is generated by the message generator 1030, according to the MCS level. The OFDM modulator 1034 converts the frequency-domain data provided from the encoder 1032 into time-domain sample data (i.e., OFDM symbols) by performing an IFFT operation. The DAC 1036 converts the sample data provided from the OFDM modulator 1034 into an analog signal. The RF processor 1038 converts the baseband analog signal provided from the DAC 1036 into an RF signal.

Figure 11:
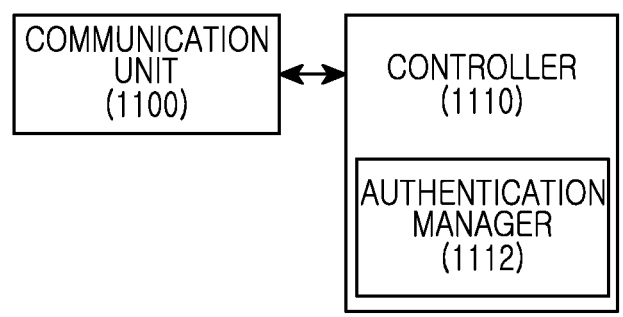
FIG. 11 is a block diagram illustrating a structure of an ASN-GW in a wireless communication system according to an exemplary embodiment of the present invention.

FIG. 11 is a block diagram illustrating a structure of an ASN-GW in a wireless communication system according to an exemplary embodiment of the present invention.

Referring to FIG. 11, the ASN-GW includes a communication unit 1100 and a controller 1110.

The communication unit 1100 provides an interface for performing communication with other nodes on a network.

The controller 1110 provides overall control to the ASN-GW. The controller 1110 includes an authentication manager 1112 to store authentication related information of MSs (e.g., context information, loss-tolerant ID, etc.) and to provide the authentication related information at the request of other nodes. In particular, when a message for requesting the context information for the MS is received from a BS or when an ASN-GW replacement event occurs for a specific MS, the controller 1110 controls and processes a function for generating a new loss-tolerant ID for the specific MS and for transmitting the generated ID to the BS. In this case, the controller 1110 may generate and transmit a disguise ID for security of the new loss-tolerant ID.

Although it has been described above that the authenticator stores MS context information for example, an exemplary embodiment of the present invention may also equally apply to a case where the MS context information is stored in a different network device. Of course, in this case, an ID of the different network device may be used instead of the aforementioned authenticator ID to search for the MS context information by configuring the loss-tolerant ID and the ID of the different network device into one ID.

Although it has been described above that the disguise ID is generated and transmitted to reliably deliver the new loss-tolerant ID, the new loss-tolerant ID may be directly transmitted, and the new loss-tolerant ID may be transmitted by encrypting the ID by using a key-wrap scheme.

According to exemplary embodiments of the present invention, when an MS in a coverage loss state intends to reenter a network, a BS obtains the information of the MS from an authenticator by using MS identification information shared between the MS and the network so as to perform a network reentry procedure of the MS. Therefore, even if the information of the MS is deleted in the BS, the network reentry procedure is performed without having to perform an initial network entry procedure, thereby decreasing a delay time for communication resumption of the MS. In addition, there is an advantage in that system overhead can be decreased.

While the present invention has been shown and described with reference to certain exemplary embodiments thereof, it will be understood by those skilled in the art that various changes in form and details may be made therein without departing from the spirit and scope of the present invention as defined by the appended claims and their equivalents. Therefore, the scope of the invention is defined not by the detailed description of the invention but by the appended claims and their equivalents, and all differences within the scope will be construed as being included in the present invention.

What is claimed is:

1. A method of a Mobile Station (MS) for network reentry in a wireless communication system, the method comprising:
   receiving allocation of a first context search identifier from a network while a network entry procedure is performed;
   transmitting a ranging request message including the first context search identifier to a Base Station (BS) when a network reentry event occurs; and
   receiving a ranging response message including a second context search identifier from the BS,
   wherein at least one of the first context search identifier and the second context search identifier is used to retrieve the context of the MS.

2. The method of claim 1, wherein the ranging request message is for the network reentry after a coverage loss occurs.

3. The method of claim 1, wherein the network reentry event occurs either in a case where the MS loses coverage of the BS or in a case where the MS enters a Deregistration with Content Retention (DCR) mode.

4. The method of claim 1, wherein the first context search identifier includes at least one of an identifier of a network device for storing context information of the MS and an MS identifier generated by the network device.

5. A method of a Base Station (BS) for network reentry of a Mobile Station (MS) in a wireless communication system, the method comprising:

transmitting to the MS a first context search identifier received from a network device during a network entry procedure of the MS;
receiving a ranging request message including the first context search identifier from the MS;
obtaining the context for the MS by using the first context search identifier;
determining whether the MS is valid by using the context for the MS; and
transmitting to the MS a second context search identifier received from the network device,
wherein at least one of the first context search identifier and the second context search identifier is used to retrieve the context of the MS.

6. The method of claim 5, wherein the ranging request message is for the network reentry after a coverage loss occurs.

7. The method of claim 5, wherein the obtaining of the context for the MS comprises:
determining whether the context for the MS corresponding to the first context search identifier exists in the BS;
if the context for the MS does not exist in the BS, requesting the network device to transmit the context for the MS corresponding to the first context search identifier; and
receiving the context for the MS from the network device.

8. The method of claim 5, further comprising:
upon receiving the context for the MS from the network device, receiving a second context search identifier; and
if the MS is valid, transmitting to the MS a ranging response message including the second context search identifier.

9. The method of claim 5, wherein the network device is one of an authenticator and an Access Service Network GateWay (ASN-GW) including the authenticator.

10. A Mobile Station (MS) apparatus for network reentry in a wireless communication system, the apparatus comprising:
a receiver for receiving allocation of a first context search identifier from a network while a network entry procedure is performed;
a controller for providing control to generate a ranging request message including the first context search identifier when a network reentry event occurs; and
a transmitter for transmitting the ranging request message,
wherein, in response to the network reentry event, the receiver receives a ranging response message including a second context search identifier from the BS, and
wherein at least one of the first context search identifier and the second context search identifier is used to retrieve the context of the MS.

11. The apparatus of claim 10, wherein the ranging request message is for the network reentry after a coverage loss occurs.

12. The apparatus of claim 10, wherein the network reentry event occurs either in a case where the MS loses coverage of a Base Station (BS) or in a case where the MS enters a Deregistration with Content Retention (DCR) mode.

13. The apparatus of claim 10, wherein the first context search identifier includes at least one of an identifier of a network device for storing context information of the MS and an MS identifier generated by the network device.

14. A Base Station (BS) apparatus for network reentry of a Mobile Station (MS) in a wireless communication system, the apparatus comprising:
a transceiver for transmitting to the MS a first context search identifier received from a network device during a network entry procedure of the MS, and for receiving a ranging request message including the first context search identifier from the MS; and
a controller for obtaining the context for the MS by using the first context search identifier and for determining whether the MS is valid by using the context for the MS,
wherein the transceiver transmits to the MS a second context search identifier received from the network device, and
wherein at least one of the first context search identifier and the second context search identifier is used to retrieve the context of the MS.

15. The apparatus of claim 14, wherein the ranging request message is for the network reentry after a coverage loss occurs.

16. The apparatus of claim 14, wherein the controller determines whether the context for the MS corresponding to the first context search identifier exists in the BS, requires the network device to transmit the context for the MS corresponding to the first context search identifier if the context for the MS does not exist in the BS, and receives the context for the MS from the network device.

17. The apparatus of claim 14, wherein the transceiver receives the second context search identifier upon receiving the context for the MS from the network device, and transmits to the MS a ranging response message including the second context search identifier if the MS is valid.

18. The apparatus of claim 14, wherein the network device is one of an authenticator and an Access Service Network GateWay (ASN-GW) including the authenticator.

* * * * *